United States Patent [19]

Billet

[11] 4,336,871
[45] Jun. 29, 1982

[54] CLUTCH MECHANISM
[75] Inventor: René Billet, Lamorlaye, France
[73] Assignee: Societe Anonyme Francaise du Ferodo, Paris, France
[21] Appl. No.: 45,649
[22] Filed: Jun. 5, 1979
[30] Foreign Application Priority Data
   Jun. 9, 1978 [FR] France ............... 78 17286
[51] Int. Cl.³ ............................................. F16D 13/71
[52] U.S. Cl. .............................. 192/107 C; 192/89 B
[58] Field of Search ......................... 192/107 C, 89 B
[56] References Cited
   U.S. PATENT DOCUMENTS

| 2,321,821 | 6/1943 | Katcher ............... 192/107 C |
| 2,541,611 | 2/1951 | Reed . | |
| 4,084,674 | 4/1978 | de Gennes . | |
| 4,114,740 | 9/1978 | Sugiura et al. ............... 192/89 B |

FOREIGN PATENT DOCUMENTS

| 2116423 | 10/1972 | Fed. Rep. of Germany .... 192/89 B |
| 2355825 | 5/1975 | Fed. Rep. of Germany .... 192/89 B |
| 882854 | 3/1943 | France . |
| 2146722 | 3/1973 | France . |
| 2242892 | 3/1975 | France . |
| 2318345 | 2/1977 | France ............... 192/89 B |
| 1388072 | 3/1975 | United Kingdom .......... 192/89 B |

Primary Examiner—Robert Mackey
Attorney, Agent, or Firm—Charles E. Brown

[57] ABSTRACT

In a motor vehicle clutch cover assembly comprising a cover, a pressure plate rotatable with the cover but movable axially relative thereto, and axially-acting resilient means such as a diaphragm located between the cover and the pressure plate and operable to urge the pressure plate away from the cover, the invention provides one or more retaining shims adapted to limit the displacement of the pressure plate relative to the cover, and corresponding apertures in the cover which allow the retaining shims to be removed or inserted. The retaining shims are fitted either during removal of the cover assembly for servicing, or during replacement, and by restricting displacement of the pressure plate reduce the effective axial dimension of the cover assembly thereby facilitating removal or replacement of the assembly in a confined space.

9 Claims, 6 Drawing Figures

CLUTCH MECHANISM

BACKGROUND OF THE INVENTION

The present invention relates generally to clutches, and particularly to motor vehicles clutches, and deals more specifically with that part of a clutch, commonly called the cover assembly, which forming a unit in itself, is attached to the reaction plate after the insertion of a friction disc.

Generally speaking such a cover assembly comprises a first annular part known as the cover, a second annular part known as the pressure plate associated in rotation with the cover by coupling means permitting an axial movement of said pressure plate relative to said cover, and between the cover and the pressure plate, axially acting resilient means urging the pressure plate in a direction away from the cover.

Dealing e.g., with a mechanism for a diaphragm clutch, the resilient means are constituted by the peripheral part, forming a Belleville washer, of a third annular part known as the diaphragm, the central portion of which is fragmented into radial fingers for actuation by the clutch release mechanism, the radial fingers controlling the pivoting of the diaphragm within the assembly, and the diaphragm bearing upon the pressure plate by its peripheral portion.

As is well known, a clutch is intended to be inserted between a driving shaft and a driven shaft. In a motor vehicle, the driving shaft is constituted by the engine output shaft and the driven shaft by the input shaft of the gearbox.

In the case of an in-line assembly of the engine and gearbox, the location of the gearbox is often inaccessible, particularly when the engine is arranged transversely of the vehicle; furthermore, it is a requirement that the axial dimension of the clutch, and hence of its mechanism, must be the smallest possible.

Now hitherto, the axial dimension of a clutch cover assembly depends upon the state, free or under load, of the axially acting resilient means interposed between the cover and the pressure plate.

This is the case especially where, as mentioned hereinbefore, the resilient means comprise the peripheral portion of a diaphragm.

In this case, when the pressure plate moves axially away from the cover, the central portion of the diaphragm which is fragmented into radial fingers moves away simultaneously from the pressure plate in a sense of movement which is axially opposite to that of the pressure plate; when the clutch mechanism concerned is in the free state, i.e., prior to assembly when it is not fitted to the reaction plate, this central portion projects axially beyond the cover, through the central aperture thereof, and it is the edge of this aperture which limits its projection, the central portion bearing against this edge.

It is only in the position of maximum clearance of the clutch, when the peripheral portion forming a Belleville washer of the diaphragm is under load, (i.e. when the cover assembly is bolted to the reaction plate), that the central portion of the diaphragm occupies a minimum axial space, for which it can be completely contained in the overall volume of the cover.

Now, it is desirable that the dismantling and removal of a clutch cover assembly, necessary for its replacement or for its repair, should be performed radially, and impose only a limited action of withdrawal or of dismantling on the various other elements involved.

It is easy to understand that, for such a radial withdrawal of the clutch assembly, any axial projection of the central portion of the diaphragm from the cover is likely to make such a withdrawal more difficult, or even impossible without necessitating a general dismantling of the gearbox and/or of the engine, if the space actually available for this withdrawal is no more than the axial dimension of the cover alone.

Now, on any assumption, such a projection inevitably occurs as soon as the assembly is detached from the reaction plate.

Inversely, the repositioning of this cover assembly, or the positioning of a new assembly in substitution therefor, is difficult, if not impossible, to perform radially under the conditions of reduced free axial dimension stipulated hereinbefore, and for the same reasons as those explained.

In French Pat. No. 882,854, which concerns a clutch in which the resilient means to which the pressure plate is subjected are formed by helicoidal springs acting axially between the cover and said pressure plate, (and not by the peripheral portion of a diaphragm), it was proposed to use a retaining wedge adapted to maintain the pressure plate axially in relation to the cover, against the action of the resilient means.

The retaining wedge proposed for this purpose must however be inserted between the cover and the head of a rivet which, being integral with the pressure plate, extends axially through the cover.

It is therefore only suitable for clutch cover assemblies provided with rivets; it is not suitable for assemblies which do not use rivets.

It is an object of the present invention to provide an arrangement which, by permitting a direct action of a retaining shim between the pressure plate and the cover, enables this difficulty to be overcome and which at the same time present other advantages.

SUMMARY

Accordingly, the present invention provides a clutch cover assembly comprising a cover, a pressure plate, connected for rotation with said cover by coupling means permitting an axial displacement of said pressure plate relative to said cover, and, between the cover and the pressure plate, axially acting resilient means urging said pressure plate in a direction away from said cover, and with which there is associated at least one retaining shim adapted to maintain the pressure plate axially in relation to the cover against the resilient means acting on said pressure plate, a passage being formed radially in the cover for the positioning of the retaining shim.

In practice, three retaining shims are provided, and two embodiments are suitable; one has distinct individual shims, and in the other, the shims are integral with a support and handling member.

Be that as it may, by virtue of the passages provided in the cover, said retaining shims can come directly into engagement with the pressure plate on the face of the latter opposite the cover, and they are easy and rapid to position.

Bearing against the cover, they retain the pressure plate axially, whilst maintaining the deformation of the axially acting resilient means acting upon it.

The clutch mechanism concerned therefore occupies a minimum axial dimension which facilitates its radial mounting or demounting.

Moreover, the radial passages provided according to the invention in the cover can advantageously be utilized for the provision of the balancing holes which it is customary to make in the pressure plate after it is coupled to the cover.

Moreover, said radial passages advantageously improve in service the internal ventilation of the clutch in question.

Lastly, they facilitate the discharge of the dust which, originating from the friction linings of the friction disc, would be such as to modify prematurely the friction characteristics of the latter with the pressure plate and/or the reaction plate.

DESCRIPTION OF THE PREFERRED EMBODIMENTS

Figure 1:
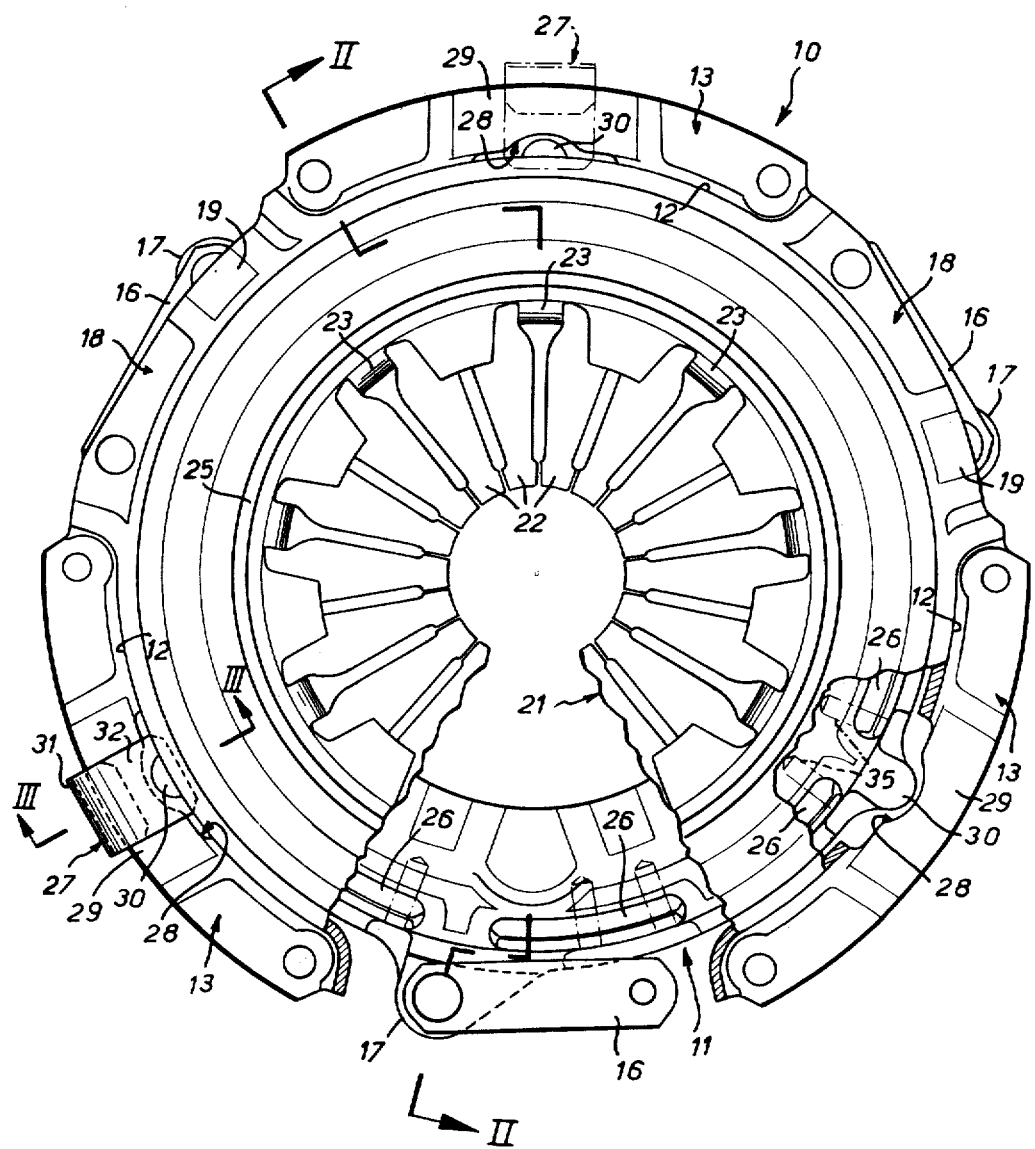
FIG. 1 is a view in elevation, partially fragmented, of a clutch cover assembly according to the invention.

Referring to the drawings, a clutch cover assembly comprises a cover 10, a pressure plate 11, and interposed between these parts, axially acting resilient means comprising diaphragm 21 which bears against the cover 10 to push the pressure plate 11 in a direction away from the cover.

In the embodiment illustrated, the cover 10 comprises laterally a generally cylindrical skirt 12 and, radially, a peripheral flange which, at the axial end of the skirt 12, has a plurality of generally plane areas 13.

The plane areas 13, which are three in number in the embodiment illustrated, and which are distributed regularly circumferentially, are intended to permit the cover 12 to bear against the reaction plate 14 upon which the cover assembly in question is to be attached, after insertion of a friction disc 15 between the reaction plate 14 and the pressure plate 11.

Figure 2:
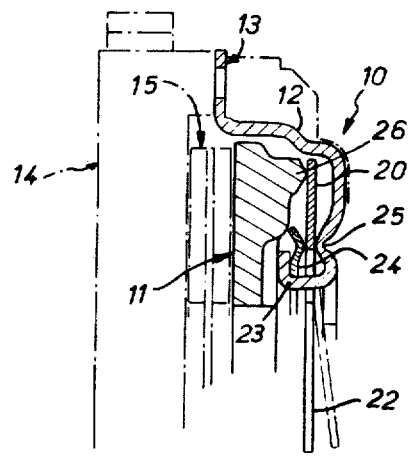
FIG. 2 is a view in axial section of this clutch assembly, taken along the broken line II—II of FIG. 1.

In FIG. 2, the reaction plate 14 and the friction disc 15 have been shown schematically in broken lines.

In manner known per se and disclosed, for example in French Pat. No. 2,242,892, the pressure plate 11 is associated in rotation with the cover 10 by coupling means permitting an axial displacement of the pressure plate with reference to the cover; these coupling means comprise tongues 16 which extend substantially tangentially with reference to the assembly and which are grouped in sets, each of said sets, (three in number in the example illustrated) extending between a radial lug 17 provided for that purpose on the external circumference of the pressure plate 11, and a plane area 18 on the peripheral flange of the cover 10, these areas 18 being recessed axially with reference to the plane areas 13 and alternating with them.

Between a plane area 13 and a plane area 18, the peripheral flange of the cover 10 is formed opposite the corresponding radial lug 17 of the pressure plate 11 with a plane area 19 axially recessed in relation to the plane area 18.

The axially acting resilient means interposed between the cover 10 and the pressure plate 11 are constituted by the peripheral portion 20, forming a Belleville washer, of the diaphragm 21, the central portion of which is fragmented into radial fingers 22.

In manner known per se as disclosed, for example, in U.S. Pat. No. 4,084,674; assembly means connect the diaphragm 21 pivotingly to the cover 10; these are, in the embodiment illustrated, lugs 23 which, are integral with the cover 10 and are bent out therefrom, to penetrate the diaphragm 21 axially via passages formed between the radial fingers 22 at their roots; beyond the diaphragm 21, these lugs 23 are bent over to engage a washer 24, between which and an annular bead 25 of the cover 10 the diaphragm 21 is supported.

The peripheral portion 20 of the diaphragm 21 thus bears on the cover 10 by the annular bead 25, and bears on the pressure plate 11 by abutments 26 formed thereon.

These arrangements are well known per se, and will not be described in greater detail here. Furthermore, there should not be considered in any way whatsoever as limiting the scope of the invention.

According to the invention, there is associated with the cover assembly at least one retaining shim 27, detailed hereinbelow, adapted to maintain the pressure plate 11 axially in position relative to the cover 10, against the action of the axially acting resilient means interposed between the pressure plate and the cover; for the positioning of the retaining shim 27, the cover 10 is provided with a radial passage 28.

In the embodiments illustrated in the drawings, for positioning the three retaining shims 27, three passages 28 are provided which are preferably distributed regularly circularly and which, for example and as shown, alternate with the areas 18 of the cover 10, each of said passages 28 extending level with the median portion 29 of the other plane areas of said flange, namely the plane areas 13 which bear against the reaction plate 14.

Figure 3:
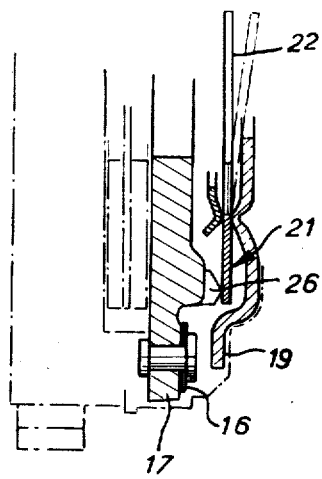
FIG. 3 is another partial view in axial section of the same assembly, to different scale, taken along the line III—III of FIG. 1, illustrating the positioning of a retaining shim according to the invention.
Figure 3:
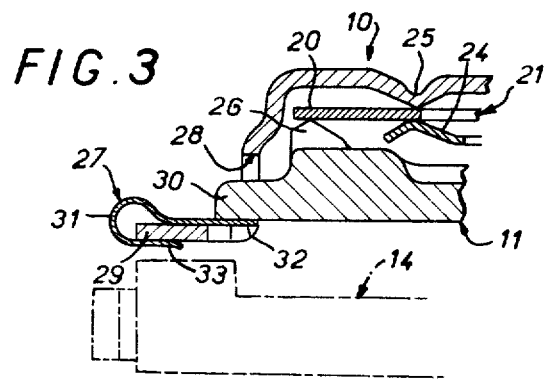

In practice, the median portion 29 of an area 13 is, in the embodiment illustrated in FIGS. 1 to 3, axially recessed with reference to the remaining portion of area 13; in order to simplify FIG. 2, no such median portion has been shown, which is assumed to be confined to being only a local section, without representing the elements arranged beyond the corresponding line of section; the same also applies to FIG. 3.

Each passage 28 of the cover 10, which has a closed contour, extends substantially to the skirt 12 of the cover 10, from the corresponding plane area 13, and extends only partially into said plane area 13.

Correspondingly, according to the invention, the pressure plate 11 is provided with a radial protuberance 30 projecting from its external circumference opposite each radial passage 28 of the cover 10.

In practice, and as illustrated, the protuberance 30 extends radially beyond the overall contour of the skirt 12 of the cover 10.

As three retaining shims 27 are provided, the pressure plate 11 comprises three protuberances 30 which alternate with its lugs 17.

According to the invention, a retaining shim 27 is intended to be engaged radially in the corresponding radial passage 28 of the cover 10, so as to come directly into engagement with the pressure plate 11, and thus to produce an axial retention of said pressure plate 11 by bearing on the cover 10.

In the embodiment illustrated in FIGS. 1 to 3, each retaining shim 27 is in the form of a hairpin having a generally U-shaped configuration suitable for its radial engagement on the median portion 29 of a plane area 13 of the flange of the cover 10, and comprising on each side of a median portion 31 forming a flexure spring, an arm 32 of sufficient length to engage in the corresponding radial passage 28 of the cover 10 and to come directly into engagement with the pressure plate 11, and an arm 33 of shorter length.

By virtue of its median portion 31 forming a flexure spring, each retaining shim 27 is resilient and can therefore maintain itself resiliently on the median portion 29 of a plane area 13 of the flange of the cover 10, by clamping between its arms.

In the embodiment illustrated, the retaining shims 27 are intended to co-operate directly with the transverse face of the pressure plate 11 opposite the cover 10.

In FIG. 1, only one retaining shim is shown in solid lines, another retaining shim being shown in broken lines, whereas the third is assumed to have been removed.

For the positioning of the retaining shims 27 according to the invention, the radial fingers 22 of the diaphragm 21 are acted upon in the direction of the arrow F of FIG. 2, so as to produce a maximum load relief of the pressure plate 11, and therefore so as to permit a maximum withdrawal of the latter towards the cover 10, by maximum deformation of the peripheral portion 20 of the diaphragm 21.

Each retaining shim 27 is then engaged radially on the median portion of the corresponding area 13 of the flange of the cover 10.

In practice, each retaining shim 27 is positioned in sequential order: initially a first one, then after rotating the mechanism through one-third of a turn, a second one, and lastly, after a fresh rotation of the mechanism through one-third of a turn, the third one.

As will be understood, the axial withdrawal, with reference to the remaining portion of an area 13, of the median portion 29 upon which a retaining shim 27 has been positioned, permits the passage between the cover 10 and the reaction plate to which it is fixed of the arm 33 of the shim.

The retaining shims 27 being then interposed by their arms 32 along the path normally swept by the pressure plate 11 when it is freely subject to the axial thrust exerted upon it by the diaphragm 20, they retain the pressure plate 11 when the action previously exerted upon the radial fingers 22 of the diaphragm is relaxed, and they therefore maintain it axially with reference to the cover 10.

The design conditions are such that, for this position of the pressure plate 11, which corresponds to the position of maximum clearance of the latter and of maximum deformation of the peripheral part 20 of the diaphragm 21, the radial fingers 22 of the diaphragm are fully contained in the overall contour of the cover 12, such as it is shown in solid lines in FIG. 2.

The radial clearance of the clutch mechanism relative to the reaction plate 14 is thereby facilitated.

This would not be so if the pressure plate were released, the radial fingers 22 of the diaphragm 21 then occupying a configuration for which, as shown schematically by broken lines in FIG. 2, they project axially beyond the cover 10 through the central aperture thereof, in spite of the support which they obtain from the edge of said aperture.

It will be understood that the positioning of a replacement clutch cover assembly on a reaction plate is facilitated by the retaining shims according to the invention.

In practice, such a replacement assembly is preferably delivered with its retaining shims in place to the mechanic responsible for fitting it, the latter not necessarily having available sufficiently powerful means to effect the compression of the diaphragm 21 necessary for positioning the shims.

As will be observed, and as shown schematically by broken lines in FIG. 1, the passages 28 of the cover 10 may advantageously be utilized for making balancing holes 35 in the pressure plate 11; furthermore, they contribute to the ventilation of the assembly, and to the removal of any dust.

Figure 5:
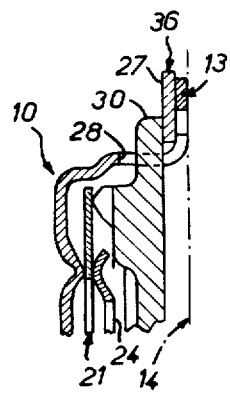
FIG. 5 is a partial view in axial section of the assembly shown in FIG. 4, taken along the line V—V of FIG. 4.
Figure 4:
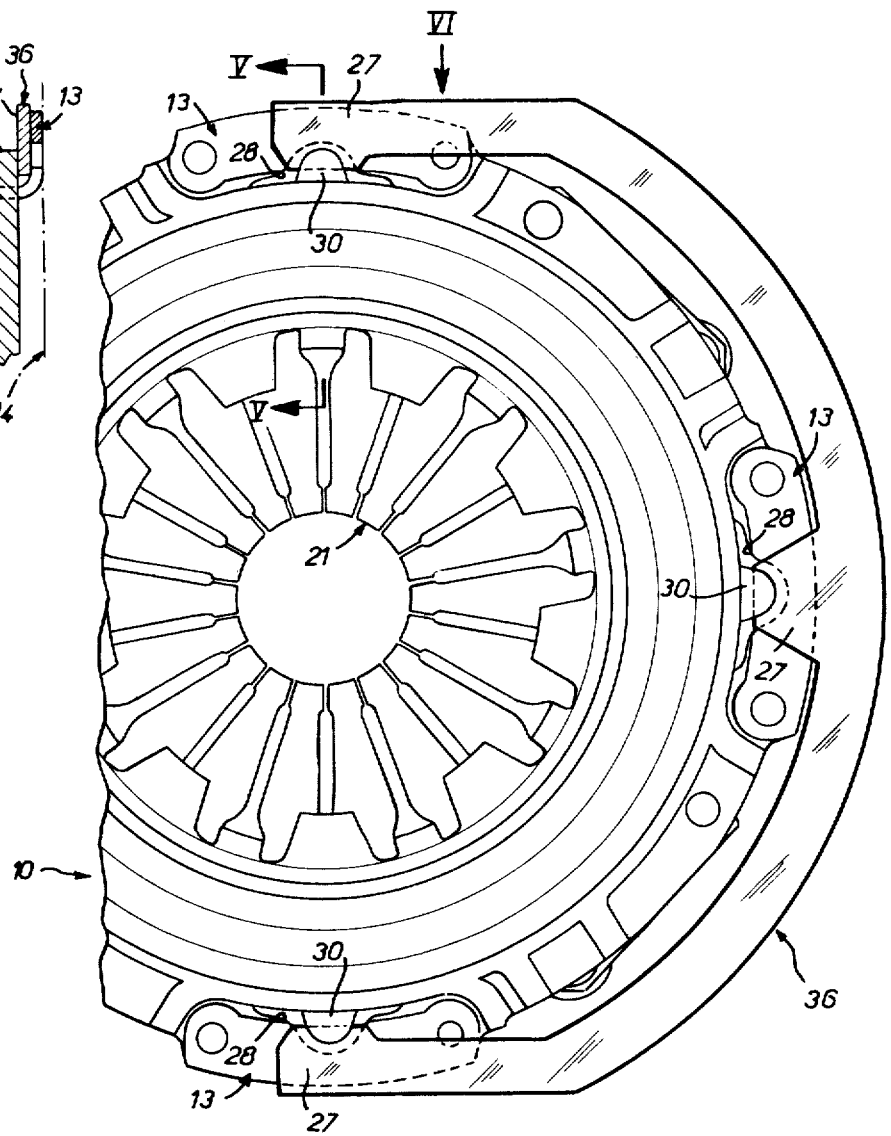
FIG. 4 is a partial view similar to that of FIG. 1 showing a different embodiment.
Figure 6:
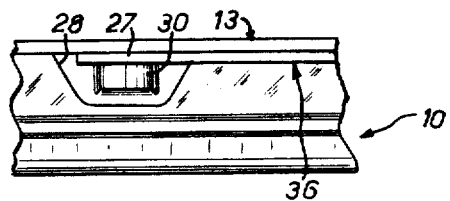
FIG. 6 is a partial lateral view of the same assembly, taken in the direction of the arrow VI in FIG. 4.

According to the variant illustrated in FIGS. 4 to 6, the retaining shims 27 are connected to one another circumferentially by an arcuate common support and handling member 36.

In practice, and as illustrated, such a member extends generally over a half circumference, two retaining shims 27 being in diametrically opposite positions with reference to each other, whereas the third occupies a median position.

In itself, the arcuate member 36 provides an axial counterthrust to the retaining shims 27, equivalent to that previously provided by the arms 33 of the stirrups in the embodiment illustrated in FIGS. 1 to 3. Since such an arm 33 is no longer necessary, the areas 13 of the flange of the cover 10 are uniformly plane, with no axially recessed part for the passage of an arm 33.

In the embodiment illustrated in FIGS. 4 to 6, the positioning of a retaining shim 27 is properly speaking no longer affected radially, but tangentially: after eliminating two of the screws effecting the fixing of the cover 10 to the reaction plate 14, the others remaining in place, the retaining shims present at the ends of the member 36 are placed level with the positioning of the screws thus eliminated, then the member 36 is slid radially from right to left in FIG. 4 to engage the retaining shims which it carries beneath the corresponding protuberances 30 of the pressure plate.

As previously, when once in place, each retaining shim 27 bears upon two faces, the one of the cover 10 and the other of the pressure plate 11, which are turned towards each other axially.

However, in this variant, the areas 13 of the cover 10 are entirely plane, each of the areas 13 lacking in this case its median portion axially recessed with reference to the remainder of such an area.

The present invention is not limited to the embodiments described and illustrated, but embraces any variant and/or a combination of their elements within the scope of the appended claims.

I claim:

1. A clutch cover assembly comprising a cover having a generally cylindrical skirt and a radially extending peripheral mounting flange with at least one plane area, a pressure plate mounted in said cover for axial displacement of said pressure plate relative to said cover, axially acting resilient means operatively disposed between said cover and said pressure plate and urging said pressure plate away from and out of said cover, and in an inoperative storage state of said clutch cover assembly at least one retaining shim positively defining and axially maintaining the position of said pressure plate within said cover and relative to said cover against the force of said resilient means, a passage through said skirt of said cover in line with said plane area on said flange, said retaining shim being of generally U-shaped hairpin configuration and being radially inwardly inserted through said passage and resiliently clamped in place on opposed sides of said flange, said shim having a leg adjacent to and facing said cover flange, said leg being disposed axially between the face of said pressure plate facing away from said axially acting resilient means and said cover flange.

2. A clutch cover assembly according to claim 1, characterized in that said passage also extends into said plane area of said flange.

3. A clutch cover assembly according to claim 1, wherein said pressure plate has a radially projecting protuberance opposite said radially extending passage.

4. A clutch cover assembly according to claim 3, wherein said pressure plate has at least one radial balancing hole disposed radially opposite said passage in said cover.

5. A clutch cover assembly according to claim 3, wherein said protuberance extends radially outwardly beyond the outer contour of said skirt of said cover.

6. A clutch cover assembly according to claim 1, a plurality of said passages are provided in said cover skirt, wherein said passages being radially extending and uniformly circumferentially spaced from one another and there being a plurality of said retaining shims each radially inwardly inserted in a respective one of said passages.

7. A clutch cover assembly according to claim 1, wherein said hairpin retaining shim has two legs and is resilient, and said legs resiliently clamp and flange on said plane area.

8. A clutch cover assembly according to claim 1, wherein said hairpin configuration includes an intermediate bowed portion connecting said leg to another leg of shorter length and on the opposed side of said cover flange from the first mentioned leg.

9. A clutch cover assembly according to claim 1, wherein said hairpin configuration extends over the entire radial extent of said cover flange in alignment with said passage.

* * * * *